United States Patent [19]

Fan

[11] Patent Number: 4,883,674

[45] Date of Patent: Nov. 28, 1989

[54] CONTROLLED ATMOSPHERE CUT FRUIT PACKAGE AND METHOD

[75] Inventor: Steve T. Fan, Maple Grove, Minn.

[73] Assignee: General Mills, Inc., Minneapolis, Minn.

[21] Appl. No.: 135,553

[22] Filed: Dec. 16, 1987

Related U.S. Application Data

[63] Continuation of Ser. No. 921,501, Oct. 22, 1986, abandoned.

[51] Int. Cl.$^4$ ............................................. A21D 10/02
[52] U.S. Cl. ..................................... 426/118; 426/106; 426/112; 426/124; 426/392; 426/415; 426/419; 426/395; 426/324
[58] Field of Search ............... 426/419, 415, 395, 396, 426/324, 316, 118, 124, 418, 106, 112, 392; 422/40

[56] References Cited

U.S. PATENT DOCUMENTS

| | | | |
|---|---|---|---|
| 2,611,709 | 9/1952 | Plagge | 426/419 |
| 3,102,777 | 9/1963 | Bedrosian et al. | 426/419 |
| 3,102,780 | 9/1963 | Bedrosian et al. | 426/419 |
| 3,239,360 | 3/1966 | Dixon . | |
| 3,450,542 | 6/1969 | Badran | 426/419 |
| 3,450,543 | 6/1969 | Badran et al. . | |
| 3,450,544 | 6/1969 | Badran et al. . | |
| 3,507,667 | 4/1970 | Magnen | 426/419 |
| 3,630,759 | 12/1971 | Rumberger . | |
| 3,795,749 | 3/1974 | Cummin et al. | 426/415 |
| 3,798,333 | 3/1974 | Cummin et al. . | |
| 3,804,961 | 4/1974 | Cummin et al. . | |
| 3,987,208 | 10/1976 | Rahman et al. | 426/415 |
| 4,001,443 | 1/1977 | Dave . | |
| 4,061,785 | 12/1977 | Nishino et al. | 426/419 |
| 4,079,152 | 3/1978 | Bedrosian et al. . | |
| 4,209,538 | 6/1980 | Woodruff . | |
| 4,224,347 | 9/1980 | Woodruff . | |
| 4,256,770 | 3/1981 | Rainey . | |
| 4,337,276 | 6/1982 | Nakamura et al. . | |
| 4,411,918 | 10/1983 | Cimino et al. . | |
| 4,411,921 | 10/1983 | Woodruff . | |
| 4,423,080 | 12/1983 | Bedrosian et al. . | |
| 4,515,266 | 5/1985 | Myers | 426/419 |
| 4,566,282 | 1/1986 | Knoblauch et al. | 426/419 |
| 4,711,789 | 12/1987 | Orr et al. | 426/415 |

FOREIGN PATENT DOCUMENTS

| | | | |
|---|---|---|---|
| 0153215 | 8/1985 | European Pat. Off. | 426/324 |
| 2033541 | 12/1970 | France | 426/415 |
| 53-8781 | 3/1978 | Japan | 426/415 |
| 60-141231 | 7/1985 | Japan | 426/324 |

OTHER PUBLICATIONS

Modern Packaging, 6/48, pp. 163–165.
American Soc. for Horticultural Science, vol. 88, p. 311 plus.
Plant Disease Reporter, vol. 53, No. 7, p. 585 plus.
New Scientist, 8/14/86, p. 35 plus.
Food Packaging, 10/86, p. 42 plus.

Primary Examiner—Steven Weinstein
Attorney, Agent, or Firm—John A. O'Toole

[57] ABSTRACT

Disclosed are packaged cut produce such as fruit salad mixtures for refrigerated storage which enjoy increased shelf life without the need for gas absorbents. The package includes a sealed imperforate container disposed within which are a quantity of perishable produce cut fruit pieces in a bed having a bed depth of about 1 to 3 inches. The package includes an equilibrium headspace composition comprising by volume of 2 to 5% oxygen, 10 to 15% carbon dioxide and balance nitrogen which, surprisingly, is optimal for substantially all cut produce blends. The package further includes a gas permeable portion such that about 4 to 12 cc. of oxygen is admittable to the package per 24 hr. per oz. of produce. In its method aspect, the present invention provides a method for refrigerated packaging and storage of cut fruit produce in a package of specified oxygen permeability.

7 Claims, No Drawings

CONTROLLED ATMOSPHERE CUT FRUIT PACKAGE AND METHOD

This is a continuatin of application Ser. No. 921,501, filed Oct. 22, 1986, now abandoned.

BACKGROUND OF THE INVENTION

1. Technical Field

The present invention relates to food products. More particularly, the present invention relates to a controlled atmosphere package for produce. In its method aspect, the present invention resides in methods for the refrigerated packaging and storage for extended periods.

2. Prior Art

Present consumer food trends strongly favor increased consumption of fresh food, especially fruits. Consumers are preparing increasing amounts of fruit and fruit salads at home. Restaurants and food service providers are also increasing their offering of fruit based salads in response to consumer desires.

While consumers find at-home fruit salad consumption is desirable from the standpoint of nutrition, taste, etc., at-home salad preparation is time consuming especially for the small portions of salads typically consumed on a daily basis. For added convenience, cut fruit produce blends suitable for quick salad preparation are available from many grocery stores. However, whether prepared at home or purchased from grocery stores, cut produce whether of one type or blends thereof typically have shelf-lives of only a few days to a week. Deterioration of the cut produce is familiar to everyone and is characterized by browning of the cut fruit pieces proximate their cut portions, wilting, color and flavor loss, loss of crisp texture, mold or rot, and the like.

Maintaining the flavor, texture and eating qualities of produce, from time of harvest through the time of purchase and actual consumption has been a problem of long-standing duration. The most common technique for preventing produce from reaching an over-ripe or deteriorated state has been to pick the produce in a relatively unripe state and retard the ripening process by the use of refrigeration. Refrigeration is not without problems. For example, tropical and sub-tropical fruits, e.g., bananas are damaged quickly at refrigerated temperatures. Some fruits become more susceptible to microbial attack.

It would be desirable, of course, to be able to extend the storage life of fresh, ripe cut fruit produce such that the produce could be immediately consumed as well as stored in a ripe state for later consumption. The prior art also includes various packaging and handling techniques for the lengthened storage of whole vegetables and fruits. However, typically whole fruit or vegetable storage shelf life is much greater than cut produce shelf life due to the protective presence of a whole skin or other membranes. The principal mechanism of decay is mold or fungal attack against the protective skin or cover. Accordingly, the teachings with respect to lengthening the storage shelf life of whole fruits and vegetables provides very little practical or valuable guidance for providing packaging for cut fruit produce to extend refrigerated shelf life. Due to the limited shelf life of present cut fruit produce, preparation and sales by grocers is primarily locally based. Extended shelf life of at least four weeks would be needed for production and sale on a regional or national scale which could take advantage of economies of scale in produce source procurement, processing, packaging and the like.

Prior efforts both in the U.S. and elsewhere for providing packaged cut produce with extended shelf life, i.e., more than 7 days, have attempted to manipulate cellular respiration rates because unlike meat or fish, cut fruit produce is still vital. Once cut off from the supply of nutrients, the cells of the produce contain a limited amount of stored energy. Generally, since cell respiration is also strongly influenced by the immediate atmosphere, one or more of three approaches have been taken to manipulate cellular respiration rates through atmosphere control. One approach is to manipulate and control the initial atmosphere sealed into the package. A second approach is to modify the internal package atmosphere by inclusion of either one or more gas absorbents or scavengers or gas releasants. Finally, the third approach is to control the gas permeability of the packaging material so as to control to ingress or egress of biologically significant gases.

U.S. Pat. No. 4,411,921 (issued Oct. 25, 1983 to R. E. Woodruff) is exemplary of modifying the first approach of providing initial atmosphere and discloses incorporation of elevated levels of CO and/or $CO_2$ with normal or reduced $O_2$ levels. In U.S. Pat. No. 4,411,918, (issued Oct. 25, 1983 to Cimino et al.) discloses apparatus for preserving food by generating preservative gas. U.S. Pat. No. 4,423,080 (issued Dec. 27, 1983 to Bedrosian et al.) is exemplary of the second approach using gas absorbents and disclose using packets of chemical agents capable of absorbing moisture and carbon dioxide. Also representative of the absorption approach is U.S. Pat. No. 4,337,276 (issued June 29, 1982 to Nakamura et al.) which discloses inclusion of zeolite, bentonate and activated carbon for absorption of released ethylene gas.

Representative of using more than one approach, namely controlling both the package gas permeability and providing a controlled initial atmosphere is U.S. Pat. No. 4,224,347 (issued Sept. 23, 1980 to R. E. Woodruff) which discloses high $O_2$ and CO initial levels and packaging material of specified gas permeability.

Notwithstanding the long-standing, widespread and intensive efforts of the prior art, the shelf life of refrigerated packaged cut produce blends to date is limited to at best 7 to 10 days. Modest improvements have been made with regard to longer storage of individual types of cut fruit product. However, extension of shelf life of blends of cut fruit produce with widely varying respiration rates, e.g., apples, pineapples and grapes, remains in the art a difficult and unresolved problem. Accordingly, there is a continuing need for improved packaged cut fruit produce blend products of extended refrigerated shelf life and method of produce storage and packaging.

SUMMARY OF THE INVENTION

In its product aspect, the present invention provides packaged cut fruit produce having extended storage life when stored at refrigerated temperatures. The package comprises a quantity of cut perishable produce disposed in the container. The produce is in a bed having a thickness of about 1 to 6 inches. The cut fruit produce is selected from the group consisting of apples, oranges, grapefruit, lemons, pineapples, bananas, blueberries, peaches, grapes, raspberries, plums, cherries and mixtures thereof.

The package has an equilibrium atmosphere comprising about 2 to 5% by volume oxygen. 10 to 15% carbon dioxide and the balance substantially all molecular nitrogen. The equilibrium atmosphere is obtained in five to ten days.

In its method aspect, the present invention resides in processes for increasing the storage life of packaged cut produce. Fresh fruit cut produce is packaged in a container having at least a portion fabricated from a gas permeable material of selected permeability and with ordinary air. The produce is then stored at refrigerated temperatures. The package is fabricated with a portion having sufficient gas permeability to allow infusion of about 4 to 12 cc. of oxygen to the package per ounce of produce per 24 hr.

The package attains an equilibrium headspace gas within about 1 to 5 days comprising about 0.8 to 1.5% oxygen, about 8 to 12% carbon dioxide and the balance nitrogen.

DETAILED DESCRIPTION OF THE INVENTION

The present invention provides packaged cut fruit produce having an extended shelf life at refrigerated temperatures. In its method aspect, the present invention provides methods for packaging and storing cut produce to realize extended shelf life.

Throughout the specification and claims, percentages are by weight except for gases which are by volume, and temperatures in degrees Fahrenheit, unless otherwise indicated.

Cut fruit produce is obtained by means common in the art and is meant to include such common materials as apples, oranges, grapefruit, lemons, pineapples, bananas, blueberries, peaches, grapes, raspberries, plums, cherries and the like. Generally, the present invention can be used in connection with fruit products having a respiration rate at refrigerated temperature (40°-45° F.) ranging from about 1-10 mg. $CO_2$/kg-hr of produce. Some fruits, however, have relatively high respiration rates, e.g., strawberries at about 18 mg $CO_2$/kg-hr and should be avoided for use herein. Thus, fruits having respiration rates outside of the above-given range are to be avoided herein.

It is to be appreciated that the present invention finds utility for use in connection primarily with cut pieces of fruit as distinguished from whole apples or oranges. The problems associated with cut produce are marketedly different from whole or uncut produce due, in part, to the exposure of interior portions of the produce to oxygen, greater surface area, cut tissue enzymatic activity, etc. compared to uncut produce which typically includes an intact protective skin or membrane. Of course, modest quantities of whole cherries or grapes can be intermixed with the cut fruit without departing from the spirit of the present invention.

The size of the cut produce pieces is not critical per se. Generally, however, the produce is cut or sliced as is done for conventional fruit salads.

It has been found helpful but not essential that the microbial load is reduced to obtaining the extended shelf life benefits of the present invention. Typically, fresh produce will have a native or natural microbial load of about $10^2$/gm measured by the aerobic plate counts ("APC"). The precise means used to achieve the microbial load reduction is not critical although it is important to follow good manufacturing practices in following the selected means. Good results have been obtained when a two-step wash procedure is employed. First, the produce pieces are washed in a cold water bath (less than about 45° F.) with mild agitation for a time sufficient to remove substantially any retained dirt or grime which may inactivate chlorine, typically about 1 to 3 minutes. Thereafter, the produce is washed in a second cold water bath containing about 100 to 250 ppm chlorine, preferably 175 to 230 ppm, and about 200 ppm chlorine for best results. Optionally, the aqueous chlorine bath can be buffered to a pH of about 5 to about 7 with an innocuous buffering salt, for example, potassium monobasic phosphate at a concentration of about 1%. The aqueous solution is maintained at a temperature of about 40° to about 60° F., preferably 40° to 45° F. The produce is advantageously dipped into the aqueous chlorine bath for a period of 1 to 2 minutes depending on the particular material and the chlorine concentration of the bath. A spray operation, to apply the aqueous chlorine to the produce, which provides an equivalent treatment in chlorine concentration temperature and time, may be used if desired.

The fruits are then cut. It is also desirable to inactivate surface browning enzymes of the cut fruit pieces. Enzyme inactivation can be readily accomplished by known methods such as by immersing the fruit pieces in a bath containing, for example, sulfites, e.g., sodium bisulfite at a level such as about 100 to 300 ppm. or a combination of ascorbic acid, citric acid and sodium chloride at a level of 1 to 3% each. The fruit pieces are mixed with mild agitation for about 5 to 10 minutes and removed from the bath. The enzyme inactivation step is preferably practiced after the aqueous chlorine wash step.

After application of the enzyme inactivation solution, the treated cut fruit is drained immediately and adhered moisture is removed. Advantageously, to remove the adhering moisture as quickly as possible without damaging the produce, the cut produce is placed in a basket-type centrifuge which is rotated at, for example, 1600 RPM for 1.5 to 6 minutes. While this treatment removes adhering moisture, it does not dehydrate the fruit pieces thereby allowing it to remain with its natural water content.

After removal of the adhering water, the produce is packaged in a sealable, imperforate but gas permeable and readily cold permeable container. The package or container may vary in size from individual consumer size ranging from about 3 to 10 oz. Any of a wide variety of packaging shapes and materials can be employed including trays, pouches, cups, bags and the like so long as the containers provide the requisite features described herein including gas permeability.

Gas permeability is important for its effect on equilibrium gas composition. Produce degradation is a complex phenomena dependent upon a variety of factors but especially upon gas composition. Cell respiration is generally characterized by one of two opposing states, aerobic and anaerobic. Anaerobic respiration typically is the respiratory mechanism at oxygen levels below about 1% by volume. Anaerobic respiration is to be strictly avoided due to its deleterious affect on cell vitality and the development of anaerobic respiration by-products such as alcohols, aldehydes and/or putrification. Apples for example, that anaerobically respire smell like cider. To extend shelf life, cell aerobic respiration must be maintained. Thus, to maintain aerobic respiration, the oxygen level must be maintained at all times above 1%.

Unfortunately, the gas composition of a sealed container is an extremely complex relationship involving such interdependent factors as respiration rates, initial atmosphere, and gas transfer, if any, into the package as well as temperature. However, it has been surprisingly found that the present containers can be sealed with ordinary air rather than requiring a special or critical initial atmosphere or flush air composition in order to provide the extension of shelf life. Due to the balance of gas permeation thru the package film and the respiration of the produce, the atmosphere inside the package attains equilibrium. The equilibrium gas composition depends on the quantity and variety of the produce, the permeability of the film, and the temperature of the storage temperature.

The container although essentially imperforate must have some gas permeability. Typically, in the U.S., gas permeability is measured in cc per 100 square inches per 24 hours at 73° F. and one atmosphere of pressure (see American Society for Testing Materials or "ASTM" D1434-66) and often is further expressed as a function of thickness measured in mils. In shorthand, the value is expressed in "cc's" with the other units being understood. For most materials, permeability values among gases are directly proportional in a ratio of nitrogen to oxygen to carbon dioxide of 1:4:8. Thus, specification of, for example, oxygen, gas permeability will also quantify approximately carbon dioxide and water vapor transfer rates as well.

The prior art includes packages for produce having low permeability, high permeability and even differential gas permeability. By differential gas permeability is meant exotic materials which depart from the conventional direct relationship between gas molecular weight and permeability rates. In the present invention, however, it has been discovered that the operable relationship for the present package is between total permeability or gas permeability of the package and the amount of produce rather than permeability of the packaging material per square inch. The present containers essentially possess a ratio of oxygen permeability ranging from about 4 to 12 cc oxygen per day per oz. of produce, preferably about 5 to 10 cc $O_2$ per day and for best results about 5 to 8 cc. Importantly, the permeability will greatly influence the equilibrium headspace composition. Gas permeabilities outside the operable ranges given herein can result in equilibrium headspace compositions substantially different from those of the present invention with adverse reductions in the shelf life of the packaged cut produce.

Thus, surprisingly, a wide variety of packaging materials, thicknesses and construction can be used in the fabrication of the present invention and resort to expensive and exotic materials of particular gas permeability can be eliminated. To achieve the above permeability values various combinations of high permeability materials can be combined with low permeable or even impermeable materials. Such permeability values for packaging materials are known and are a common packaging material technical specification.

In one preferred embodiment, the present container includes a tray fabricated from a substantially gas impermeable material, e.g., having a bottom or closed end, and if round, a circular side wall, or if rectangular, a pair of opposed spaced major side walls and a pair of opposed spaced minor side walls and an open end or top. Each of the side walls includes a peripheral shoulder around the open end and opposite to the bottom. The container further includes a closure membrane peelably sealed to the shoulder. In the preferred embodiment, the closure membrane is fabricated from a flexible printable film having an oxygen permeability ranging from about 5 to 10cc, preferably about 4 to 8 cc. An exemplary film is one fabricated from an extrusion coating of ethylene vinyl acetate over low density polyethylene (permeability 170 cc c.c.$O_2$ per 100 $in^2$ per 24 hr.). The other example is a package film fabricated from a laminate having a first layer of polycarbonate and a second layer of ethylene vinyl acetate (permeability 90 c.c. $O_2$ per 100 $in^2$ per 24 hr). Both are available from Guardian Package Co. of Chicago. The tray generally measures $8 \times 5 \times 2$ in. and holds about 3 to 10 oz. of produce. The closure membrane thus measures about $8 \times 5$ in. and measures about 40 $in^2$ in surface area. It is very important that the seal between the tray and the closure membrane do not contain any pinholes which can greatly affect oxygen ingress into the package thereby adversely affecting shelf life.

It has also been discovered that it is desirable from a practical standpoint that the fruit be loosely packed forming a bed having bed depth or thickness ranging from about 1 to 3–4 inches, preferably about 2–3 inches. Excessive bed depths can undesirably lead to gas concentration gradients within the produce bed which can lead to a shortened shelf life. The minimum bed depth is primarily limited by the size of the produce pieces. Loose packing is valuable to prevent mechanical damage to the pieces as well as to provide good gas circulation. In more preferred embodiments, the more structurally strong produce materials are layered or predominant in the lower bed, e.g., apples, pears, while more delicate produce types, e.g., cherries, oranges, are layered or predominant at the top of the produce bed.

The treated and packaged salad of this invention is allowed to maintain their biochemical activity during its storage in the bag of specified permeability characteristics; hence, the freshness, crispness and unwilted appearance is maintained for a longer time at reduced but not frozen temperatures than conventionally treated and packaged fruit salad preparations wherein the packaging film does not meet the specified permeability characteristics of the packaging material of this invention. Indeed, packaged fresh cut fruits when processed and packaged according to the present invention having a shelf life of about 6 weeks when stored at 40° F. have been obtained without unacceptable deterioration.

The extended shelf life advantages have been obtained without the need for complex and costly gas absorbents or gas producers or from packages fabricated with exotic materials or from utilization of costly flush gases.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food arts, can be undertaken without departing from the spirit and scope of this invention.

The following examples illustrate that cut fruits sealed within packages according to this invention maintain color, flavor, texture and appearance, while sealed, longer than they otherwise could.

Unless otherwise stated in the examples, all gas concentrations are stated in percentages by volume.

EXAMPLE 1

Golden Delicious apples, Sunkist oranges and Thompson grapes were purchased in the local stores. All fruits were thoroughly washed in cold water and dipped in 200 ppm chlorine water for 1-2 minutes. Optionally, the fruits can be rinsed in cold water to remove residual chlorine. Apples were sliced to yield eight pieces of cut fruit and the cores were removed from each slice. The slices averaged about 3" in length and 1" in width and weighed 20-30 gm. Oranges were peeled to yield 8 pieces of slices and grapes were removed from the bunches.

To prevent surface browning, the cut fruits were dipped in a solution, which was composed of 1% each of ascorbic acid, citric acid and sodium chloride for 10 minutes. After dipping, the solution was drained. Excess surface moisture was removed by clean cloth towels.

The slices were weighed (7oz.) in an imperforate container and sealed with a permeable, peelable package film. The film was fabricated from the lamination of polycarbonate (1 mil) and ethylene vinyl acetate (1 mil). The film had a permeability of 5 cc./oz. produce - 24 hr. The initial gas composition comprised of 15 to 30% $O_2$ and O to 5% $CO_2$, with $N_2$ as remaining balance. After one week, the atmosphere inside the package reached an equilibrium composition of $O_2$ of 1-3% and $CO_2$ of 13-15%.

The fruits maintained good eating quality for 6 weeks.

EXAMPLE 2

Pineapples and grapes were purchased from the local store and pretreated in the same manners as described in Example 1, including the washing, slicing and enzyme inactivation steps.

The cut fruits were weighed at 5 oz. per package in an imperforate container. The package was sealed with a package film which had a permeability of 16 cc. $O_2$/oz produce - 24 hr.

The cut fruits in the container were stored at 40° F. and examined periodically for eating quality and gas composition.

After two weeks, mold growth was evident to the naked eyes. The atmosphere inside the package was found to have $CO_2$ at 4-6%, $O_2$ at 10-12%, with the remaining balance as $N_2$. The short shelf life was attributed to the low $CO_2$ and high $O_2$ contents inside the package.

EXAMPLE 3

Red Delicious, Golden Delicious and Granny Smith apples were purchased in the local store and pretreated in the same manners as described in Example 1.

The mixture of cut apples were weighed at 10 oz. per package in an imperforate container. The package was sealed in a package film with a permeability of 0.1 cc $O_2$/oz produce - 24 hr.

The cut apple packages were stored at 40° F. and examined periodically for eating quality and gas composition.

After two weeks, distinct and intense cider-like off-flavor, were perceived by the taste panel. The atmosphere inside the package was found to have $CO_2$ content above 30% and $O_2$ content below 1%. The surface of cut apples were very wet resulting from the condensation of moisture. The texture of cut apples were soft and soggy. The short shelf life was attributed to the high $CO_2$ and low $O_2$ contents inside the package.

EXAMPLE 4

Apples (Golden Delicious), pears (Bosc), and cherries were purchased in the local store. The fruits were washed, sliced, except for the cherries, dipped in enzyme inactivation solution and dried according to the description of this invention.

The cut fruits (6 oz) were weighed in an imperforate container and sealed with a peelable, permeable package film. The film was manufactured by the extrusion coating of ethylene vinyl acetate over low density polyethyle. The permeability of the film was 8 cc $O_2$/oz. produce - 24 hr.

After one week, the atmosphere inside the package reached an equilibrium composition of 3-5% $O_2$ and 10-12% $CO_2$.

The fruits maintained good eating quality for six weeks.

What is claimed is:

1. A packaged food article for the extended refrigerated storage of cut fruit produce blends, comprising:
    A. a sealed imperforate continer;
    B. a quantity of a perishable produce consisting essentially of a blend of cut fruit pieces disposed within the container forming a produce bed having a bed depth ranging from about 1 to 3 inches, said blend being a mixture of a plurality of fruit species,
    wherein the container has at least a portion fabricated from a gas permeable material such as to allow about 4 to 12 cc of $O_2$ per oz of produce blend per day to permeate into the package,
    said produce blend at the time of packaging in said container having an initial microbial load of less than about 1000 APC per gram of blend and a respiration rate of less than 10 mg $CO_2$/kg-hr at 40°-45° F., and having inactivated surface browning enzymes;
    wherein the container has an initial atmosphere upon sealing within said container consisting essentially of
    about 15% to 30% by volume oxygen,
    about 0.1% to 5% by volume carbon dioxide, and the balance being substantially all molecular nitrogen,
    said container and produce blend being selected such that said container has an equilibrium atmosphere within said container comprising 2 to 5% by volume oxygen, 10 to 15% by volume carbon dioxide, and the balance being substantially all molecular nitrogen, said equilibrium atmosphere being obtained from five to 10 days after sealing and wherein the container is substantially free of chemical agents capable of absorbing gases.

2. The packaged food article of claim 1 wherein said sealed container is refrigerated.

3. The packaged food article of claim 2 wherein the total weight of said blend is in the range of from about 3 to 30 oz.

4. The packaged food article of claim 3 wherein the cut produce blend is selected from two or more members of the group consisting of apples, oranges, grapefruit, lemons, pineapples, bananas, blueberries, peaches, grapes, raspberries, plums, and cherries.

5. The packaged food article of claim 4 wherein said microbial load of said blend is less than about 100/g.

6. A method for increasing the storage life of cut fruit produce blend, comprising the steps in sequence of:
  A. placing a quantity of perishable produce consisting essentially of a blend of cut fruit pieces into a sealable package, said blend being a mixture of a plurality of fruit species, said package having at least a portion fabricated from a gas permeable material having an oxygen gas permeability such as to allow about 4 to 12 cc of $O_2$ per oz of produce per 24 hr to permeate into the package, said cut fruit produce blend at the time of packaging in said package having an initial microbial load of less than about 1000 APC per gram of blend, and a respiration rate of less than 10 mg $CO_2$/kg-hr and having inactivated surface browning enzymes;
  B. hermetically sealing within the package an initial modified atmosphere comprising 15% to 30% oxygen, 0.1% to 5% carbon dioxide by volume, the balance being substantially all molecular nitrogen; said package and produce blend being selected such that said package has an equilibrium atmosphere within said package comprising 2 to 5% by volume oxygen, 10 to 15% by volume carbon dioxide, and the balance substantially all molecular nitrogen; and equilibrium atmosphere being obtained from five to 10 days after sealing and wherein the package is substantially free of chemical agents capable of absorbing gases.
  C. and subjecting the sealed package to conditions of refrigeration for a period of about 4 to 6 weeks.

7. The method of claim 6 wherein the package additionally comprises means for absorbing condensed water vapor.

* * * * *